Sept. 20, 1960     A. J. INGOLIA     2,953,419
DOMESTIC APPLIANCE
Filed Dec. 5, 1958     3 Sheets-Sheet 1
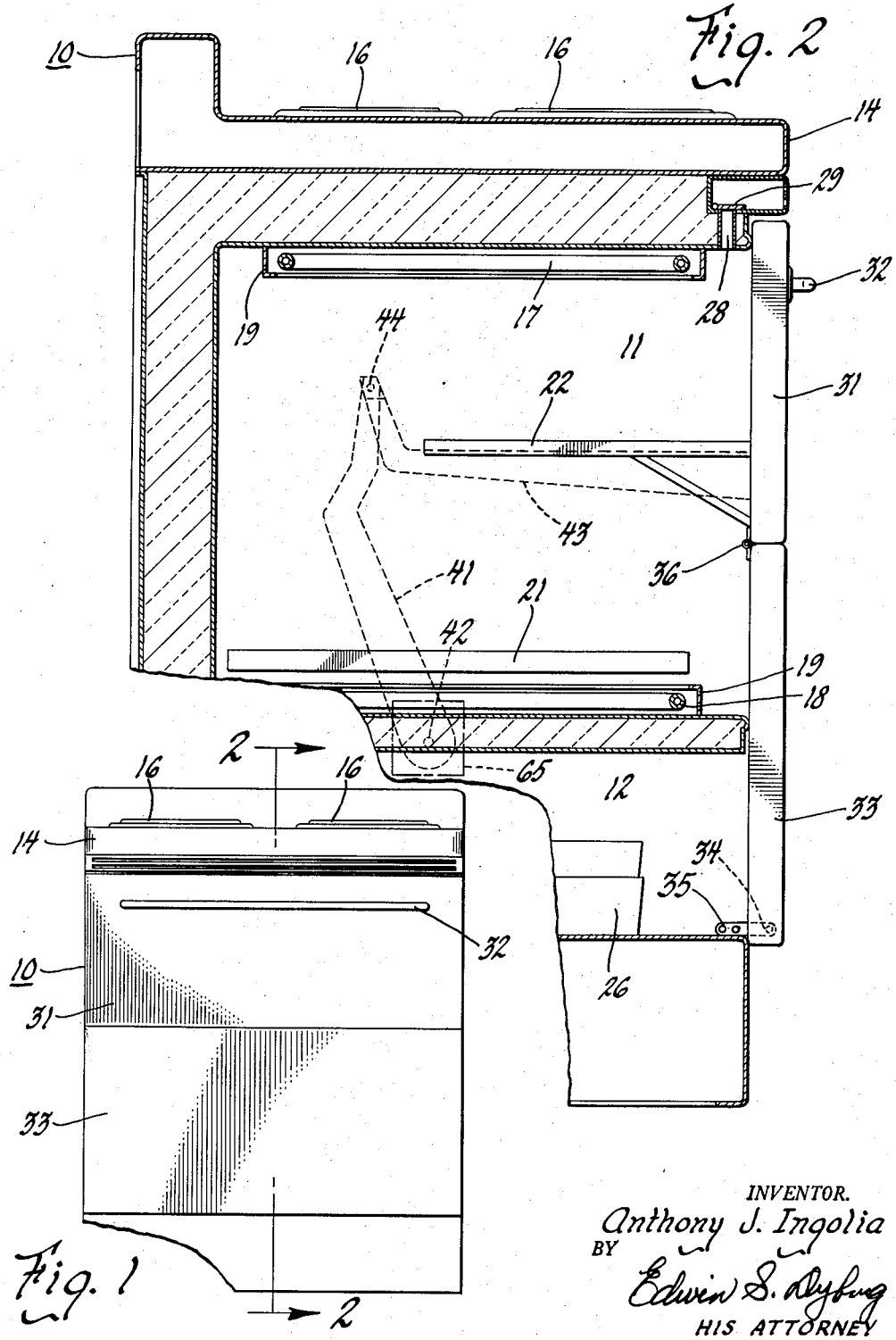
INVENTOR.
Anthony J. Ingolia
BY Edwin S. Dybvig
HIS ATTORNEY Sept. 20, 1960     A. J. INGOLIA     2,953,419
DOMESTIC APPLIANCE
Filed Dec. 5, 1958     3 Sheets-Sheet 2
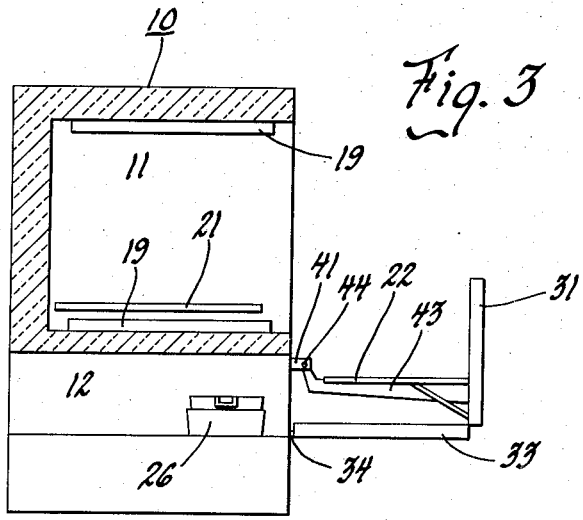
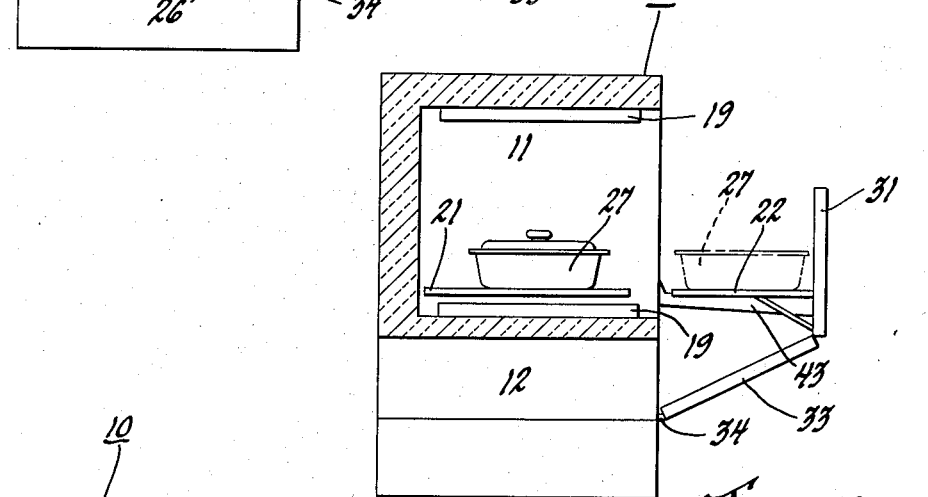
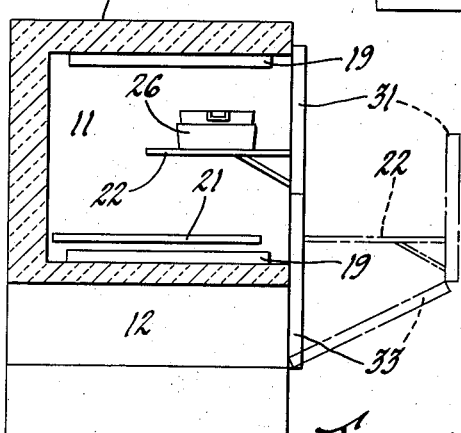
INVENTOR.
Anthony J. Ingolia
BY Edwin S. Dyking
HIS ATTORNEY

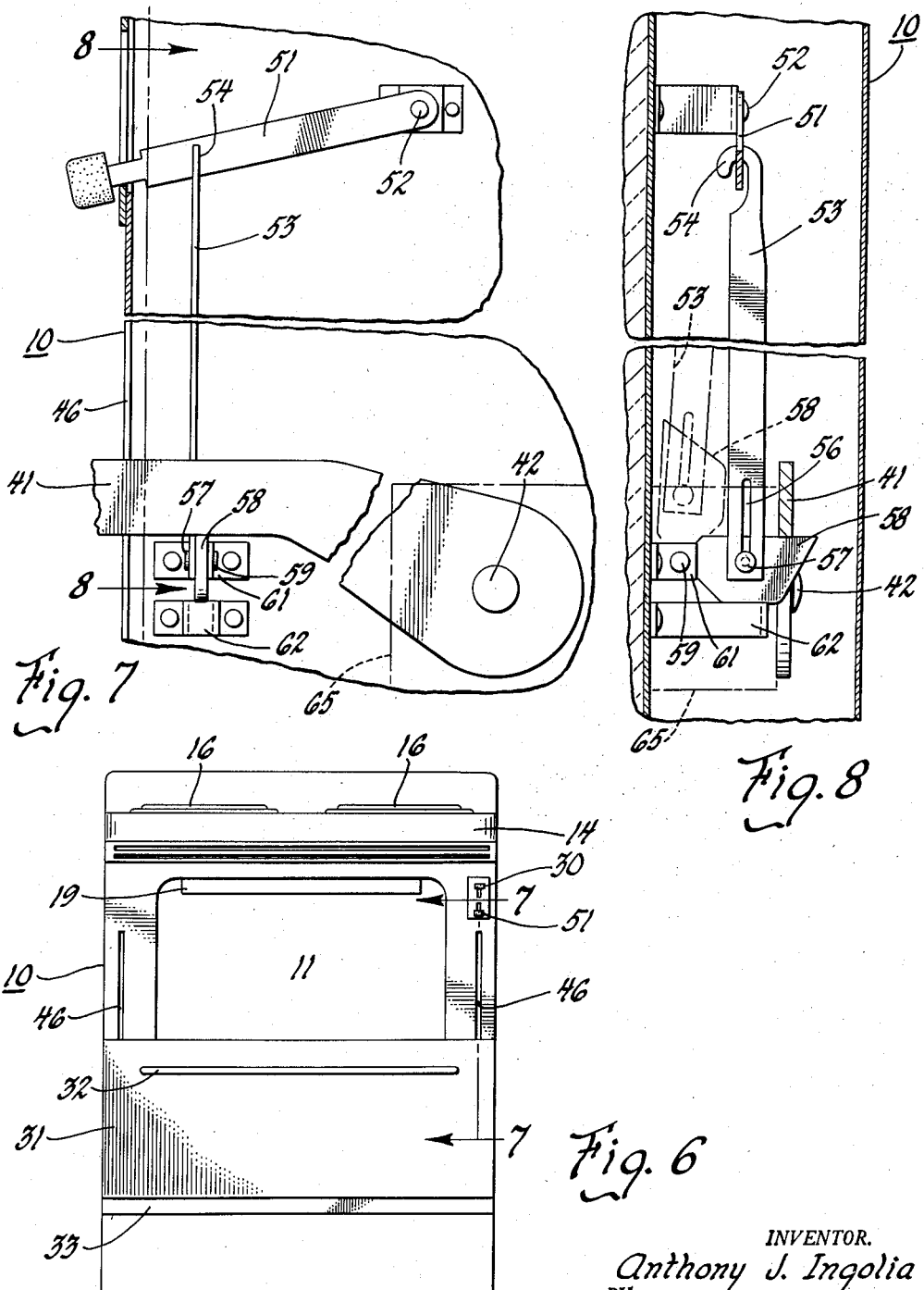

United States Patent Office 2,953,419
Patented Sept. 20, 1960

2,953,419

DOMESTIC APPLIANCE

Anthony J. Ingolia, Detroit, Mich., assignor to General Motors Corporation, Detroit, Mich., a corporation of Delaware Filed Dec. 5, 1958, Ser. No. 778,397

10 Claims. (Cl. 312—276)

This invention relates to domestic appliances such as electric cooking ranges and particularly to a shiftable sectional door arrangement therefor.

A general object of my invention is to provide a door arrangement on a cooking range which will facilitate use of the range and increase the utility of a door thereon.

Another object of my invention is to provide a closure means for a cooking range with a shelf thereon which has dual utility for use in conjunction with a broiling receptacle and/or a roasting receptacle employed in the oven thereof.

In carrying out the foregoing objects, it is a further object of my invention to provide a cooking range with a shiftable sectional closure means for the open front of an oven therein which means comprises a top door and a bottom door movable in a particular fashion relative to the range so as to render a shelf on one of the doors usable when the range oven is employed for broiling and/or roasting articles such as meat and fowl therein.

It is a still further object of my invention to provide a shelf or ledge on a top door of a two-door sectional shiftable closing means on a cooking range which shelf normally projects or extends into the range oven and is carried by the top door to move it out of the oven when the closure means is shifted and to provide a manually actuated settable stop means on the range to limit opening movement of the closure means for stopping and rigidly holding the shelf at a predetermined height outside and at the front of the oven whereby a broiler receptacle carried by the shelf is readily accessible for basting meat being broiled in the oven and/or whereby a roaster receptacle located on a support in the oven can be slid outwardly thereof in a straight horizontal line and partially supportable by the shelf to render the roaster receptacle accessible for opening same to baste the contents thereof during the roasting process.

A more specific object of my invention is to provide a settable stop means which when set and used for the purpose described in the preceding object does not interfere with moving the shiftable sectional range closure means into a position to close the range oven whereby to continue to completion a period of broiling or roasting of articles within a receptacle in the oven while so set.

Further objects and advantages of the present invention will be apparent from the following description, reference being had to the accompanying drawings wherein a preferred embodiment of the present invention is clearly shown.

In the drawings:

Figure 1 is a front view of a cooking range having a shiftable sectional closure means thereon with the present invention incorporated therein;

Figure 2 is an enlarged vertical fragmentary sectional view of the range taken on the line 2—2 of Figure 1 showing the range oven, a storage compartment therebelow and a shelf on the sectional closure means therefor disposed in the oven;

Figure 3 is a view similar to Figure 2 on a reduced scale showing the sectional closure means in fully open position with a broiler receptacle disposed in the storage compartment of the range;

Figure 4 is a view similar to Figure 3 showing the broiler on a shelf of the closure means located in the range oven and illustrating in dot-dash lines the closure means stopped in a partially open position at the front of the range oven to align the shelf thereon with a roaster receptacle support in the oven;

Figure 5 is another view similar to Figures 3 and 4 showing a roaster receptacle on a support therefor in the range oven illustrating the roaster in dot-dash lines moved out of the oven onto the shelf on the closure means;

Figure 6 is a view similar to Figure 1 with the range closure means fully open and illustrating a control on the range for a settable stop means incorporated therein and a control for an oven vent;

Figure 7 is a broken fragmentary sectional view taken on the line 7—7 of Figure 6 showing elements of a settable stop means provided on the range engageable by an arm of a leverage mechanism which movably links the top door of the range closure means to walls thereof; and Figure 8 is a broken fragmentary sectional view taken on the line 8—8 of Figure 7 illustrating in dot-dash lines the stop means elevated to permit the shifting of the range closure means into fully open position.

Referring to the drawings, there is shown in Figure 1 a cooking range 10 having a plurality of walls forming an insulated broiling, baking and roasting oven 11 therein (see Figure 2), an uninsulated compartment 12 beneath same and a top 14 provided with electric surface heaters or units 16 thereon which range is representative of a cabinet or other enclosure with which it is desired to use a shiftable sectional closure means of the present invention for closing an open front of a chamber or of a chamber and a compartment therebelow. The heating of oven 11 in the illustrated range for broiling, baking and roasting therein may be conventional and includes the usual upper and lower resistance electric heating units 17 and 18 respectively having any suitable or desirable reflector baffles 19 associated therewith. A roaster receptacle shelf or support 21 is disposed within oven 11 spaced above heater 18 and another shelf 22, removably disposed in oven 11 and spaced vertically from support 21, is rigidly secured to and carried by a part of a closure means for the range 10 as will hereinafter be more specifically described. The storage compartment 12 is adapted to have removably stored therein a broiler or broiler receptacle indicated at 26 (see Figure 3) for use in conjunction with shelf 22. The support 21 is adapted to receive and support a roaster or covered roaster receptacle indicated at 27 (see Figure 5) for containing meat or fowl to be roasted in oven 11. The broiler 26 may be of any suitable or conventional type and is preferably of the construction as is fully shown and described in the copending application of Millard E. Fry, Serial No. 654,221, filed April 22, 1957, and assigned to the assignee of this application, now Patent No. 2,869,597, while the roaster 27 may be of any usual or standard design. Insulated oven 11 is provided with a plurality of openings 28 in the forward portion of its top wall which openings are adjustable by a shutter or the like device 29 operatively connected to a control arm 30 extending outwardly of a front wall of the range (see Figure 6) and these openings serve as vents for regulating the venting of oven 11 forwardly thereof during broiling of meats, fish or the like therein. In this respect venting of the present oven differs somewhat from the conventional method of venting an oven by slightly opening or leaving the door ajar while broiling therein.

In accordance with the objects of my invention, the open fronts of oven 11 and of storage compartment 12 are normally closed by a shiftable sectional closure means. This closure means comprises an insulated top section or door 31, provided with a handle 32, and an insulated bottom section or door 33. The lower portion of bottom door 33 is pivotally mounted, as at 34, upon walls of range 10 by any suitable or conventional hinges or brackets 35 and the upper portion of this bottom door is hingedly mounted to the lower portion of top door 31 by a piano or the like hinge 36. Any suitable or conventional latching means (not shown) may be employed on range 10 to latch and hold the shiftable closure means shut against the range whereby to close the front of oven 11 and the front of storage compartment 12. A resilient gasket may, if found necessary or desirable, be secured to the edge of one of the doors 31 or 33 to be engaged therebetween when the closure means is shut to insure sealing of the front of oven 11. Shelf 22 is rigidly secured to top door 31, in any suitable or well-known manner, and is movable into and out of oven 11 when the closure means is shifted. A pair of leverage mechanisms movably connect or link top door 31 to walls of range 10. Each of these mechanisms includes a first lever arm 41 having an end thereof pivotally attached to a wall of range 10, inwardly of the outer wall thereof, by a stud or pin 42 with its other end hingedly linked to an end of a second lever arm 43 by a pin 44. The other end of second lever arm 43 is rigidly mounted, in any suitable or conventional manner, upon top door 31 of the range closure means for movement therewith relative to range cabinet 10 to cause the first lever arm 41 to rotate about stud or pin 42. Lever door arms 41 and 43 are located in a space intermediate the insulated wall of oven 11 and the outer range cabinet walls to conceal them at least while the closure means or doors 31 and 33 are closed. The lever arms move with respect to range cabinet 10 in elongated slots 46 provided in upright front side walls of the range (see Figure 6). A settable stop means, engageable by one of the lever arms of a leverage mechanism, is provided on range 10 for stopping the opening shifting movement of the range closure means at a predetermined point intermediate fully closed and fully opened shifted positions thereof. This stop means includes an operating arm 51, pivotally mounted by a pin 52 upon a wall of range 10 and projecting through the front wall of range 10 (see Figure 7) so as to be exposed at the front of oven 11 (see Figure 6), a link 53 pivotally secured at one end by a hook 54 to arm 51 and with its other or lower end pivotally attached, by a pin 57, to a movable stop member 58. A portion of the inner face of door 31 is indented or recessed so as to provide a clearance space for the exposed ends of vent control arm 30 and lever arm 51. Link 53 is provided with an elongated slot 56 for a purpose to be presently described. Stop member 58 is pivotally anchored, by a pin 59, upon a bracket 61 rigidly secured to a wall of the range cabinet. The elements 51, 53 and 58 are normally held in an upper position, as shown by the dot-dash lines in Figure 8 of the drawings, by a suitable indent means (not shown). A retainer or stop member backing bracket 62 is also rigidly secured to a wall of the range and supports stop member 58, when the settable operating arm 51 is shifted downwardly, in a horizontal position to be engaged by a lever arm 41 of the leverage mechanism for top door 31. The stop means is settable to locate or support stop member 58 in the path of movement of lever arm 41 whereby this arm engages and rests on member 58, as shown in Figures 7 and 8 of the drawings, to rigidly support the range closure means in a position to horizontally align shelf 22 on top door 31 with and in front of support 21 in oven 11. The arrangement of elements comprising this stop means and their association with lever arm 41 is such that the closure means, doors 31 and 33, may be shifted from its fully open position into closed position while the stop member 58 is set but the closure means cannot be shifted from its fully closed position into a fully open position. Should the settable stop means be set while the range closure means is in its fully open position as illustrated in Figure 3 and the closure means then moved toward closed position, arm 41 will engage the underside of stop member 58 and cam this member about pin 59 to cause pin 57 to slide upwardly in slot 56 whereby the arm 41 can be positioned above the set stop member for subsequent engagement therewith. When the operating arm 51 of the settable stop means is raised, stop member 58 rotates out of the path of lever door arm 41 into a substantially vertical position, as shown by the dot-dash lines in Figure 8, to permit the closure means to be shifted into a fully open position and the link 53 cannot be lowered until again actuated by the operating arm. Thus the stop means when set prevents the range closure means from fully opening during roasting of an article contained in the roaster receptacle 27 supported on support 21 and/or during broiling of an article contained in the broiler or broiling receptacle 26 while same is supported on and carried by shelf 22. The stop means is, however, resettable at will for permitting movement of the closure means and shelf 22 downwardly into a position to open oven 11 and compartment 12 whereby to locate the shelf 22 in front of compartment 12. In this position of the range closure means, the broiler receptacle 26 may be placed into compartment 12 and/or removed therefrom. While it appears from Figure 3 of the drawings that shelf 22 will interfere with the transfer of broiler 26 from compartment 12 thereonto or of broiler 26 from the shelf into compartment 12 it is to be understood that a portion of shelf 22 intermediate its sides may be formed inwardly of its inner edge whereby the broiler may be rotated and tilted so that its narrowest part will pass between the shelf and the bottom wall of oven 11. This provision can be made with shelf 22 still having sufficient area to support the broiler thereon. An additional means may be provided on range 10 to stop the downward movement of the closure means and support same at the desired fully opened position thereof and I prefer to utilize the bottom wall of slots 46, engageable by a door lever arm 41, for this purpose. A counterbalance mechanism or device of any suitable design or conventional construction as is well-known to those skilled in the art, generally indicated by the dot-dash lines 65 in Figure 2 of the drawings, may be mounted on range 10 for counterbalancing and easing shifting movements of the present range closure means.

As hereinbefore set forth, shelf 22 on top door 31 of the range closure means has a two-fold purpose in the present disclosure to facilitate use of the range and to increase utility of the improved door arrangement. For example, when fish or cuts of meat or the like are to be broiled in oven 11 of range 10, the sectional closure means is shifted to fully open oven 11 and compartment 12 as shown in Figures 3 and 6 of the drawings. This opening of the closure means is carried out by manually applying a pulling force to handle 32 on door 31 whereupon this top door or door section is guided by the door lever arms 41 and 43 outwardly away from the range cabinet and downwardly relative thereto continuously in vertical planes substantially paralleling the front of oven 11. This movement of top door 31 moves the upper portion of the bottom door 33 outward and swings same about its mountings 34 and 36 to thereby cause both doors or door sections 31 and 33 to be simultaneously descended and provides access to the interior of oven 11 and storage compartment 12. The construction and arrangement of the door lever arms 41 and 43 and their cooperation with the pivotal mountings of door section 33 continuously maintains door section 31, during movement of the range closure means, in vertical planes whereby shelf 22 on door 31 is at all times retained in a horizontal plane. Broiler receptacle 26, normally stored in compartment 12, is removed from this compartment and placed on shelf 22 carried by door 31 and fish or cuts of meat are inserted into the open top broiler 26. The sectional closure means, comprising doors 31 and 33, is then raised; and just prior to moving the closure means into fully closed position, the exposed end of arm 51 of the settable means on range 10 is moved down to shift stop member 58 into a horizontal position against the backing bracket 62 for setting member 58 in the downward path of movement of a door lever arm 41. At the time the stop means is set, control arm 30 is also shifted to operate the shutter 29 and open the openings 28 at the top front portion of oven 11 for venting the oven during a broiling period of cooking the fish or meat. The sectional closure means is now fully closed thereby locating shelf 22 and broiler 26 supported thereon within oven 11, above support 21, so as to expose the contents of the broiler to heat generated by the electric heater 17 in the upper portion of the range oven as shown in full lines in Figure 4. After the elapse of a certain period of time during broiling of the contents of broiler receptacle 26, the closure means is opened and shifted into the position shown by dot-dash lines in Figure 4 of the drawings whereby a door lever arm 41 strikes stop member 58 to hold or rigidly support shelf 22 in horizontal alignment with and at the front of support 21 and consequently to stop receptacle 26 on shelf 22 at an easily accessible position forwardly of oven 11. The contents of broiler receptacle 26 may be readily examined while so positioned without handling the hot receptacle and, if desired, the meat or fish being broiled can be basted before returning or reshifting the broiler back into the oven for continuing the broiling or cooking process. Subsequent to completing the broiling of fish or meat and after the broiler receptacle has been cleansed, the receptacle may be replaced upon shelf 22 and operating arm 51 manipulated to raise and retain stop member 58 out of or away from the path of movement of a door lever arm 41 so as to permit the closure means, doors 31 and 33, to be again fully opened. In such open position of the closure means, shelf 22 and the broiler receptacle 26 thereon will be in alignment with the open front of compartment 12, below oven 11, and the receptacle can be slid off the door shelf into the compartment for storage therein.

An additional utility of the present door arrangement is also present in applicant's disclosure. For example, after meat or fowl is placed in a closed or covered roaster such as the roasting receptacle 27 and inserted into oven 11 of range 10, on support 21 therein as shown in Figure 5 of the drawings, to be heated by both heaters 17 and 18 the settable door stop means is manipulated as previously described to locate the stop member 58 in the path of downward movement of a door lever arm 41 prior to fully closing the range closure means or doors 31 and 33. It is to be understood that prior to carrying out a roasting process in the range control arm 30 is manipulated to actuate shutter 29 and close the vent openings 28 whereupon oven 11 will be vented only in a restricted fashion as is conventional in the art during roasting of articles in the oven. The opening shifting movement of the closure means, doors 31 and 33, will again be interrupted or stopped by the settable stop means intermediate fully closed and fully opened positions thereof to rigidly support shelf 22 on top door 31 at the front of oven 11 in the same horizontal plane with support 21 as shown in Figure 5 of the drawings. While the closure means and shelf 22 are supported in this position, the roaster or roasting receptacle 27 within range oven 11 can be slid in a straight horizontal line or plane away from or forwardly along support 12 onto shelf 22 so as to be at least partially supportable on shelf 22 outwardly of the oven open front. The roaster receptacle is thereby moved into an easily accessible position at the front of oven 11 and its lid or cover may be readily removed for inspecting the contents thereof and to permit basting of the meat or fowl being roasted therein prior to sliding the roaster back into the oven and closing the closure means for continuing the roasting process. Thus the present door or closure means with shelf 22 thereon increases the utility of a range door and facilitates housewives' use of the range oven in several ways during cooking of articles in the oven by different methods.

From the foregoing it should be apparent that I have, by my novel sectional shiftable closure means, provided an improved cooking range wherein the manner of examining and/or of basting contents of broiler and roaster receptacles during cooking therein is greatly facilitated and carried out in a fashion which eases the work and lessens the likelihood of a housewife's or cook's fingers or hands becoming burned. The feature of at all times maintaining the shelf on the range door in a horizontal plane permits the carrying and movement of a broiler on the shelf to and fro an oven without tilting same to thereby eliminate the danger of meat cuts or fish slipping or sliding off the broiler and/or of grease being spilled from the broiler. Likewise, the sliding of a roaster outwardly of an oven in a straight horizontal line onto the door shelf of a range closure means reduces to a minimum spilling or splashing of essential cooking juices or the like from the roaster. Furthermore, my range closure means is adaptable to wall ovens as well as floor supported ranges; and when so adapted and the closure means opened, the door arrangement in addition to occupying less working or walking space in front of a range oven permits a housewife to stand closer to an oven to thereby facilitate occasional inspection and basting of food products being cooked within receptacles in the oven.

While the embodiment of the present invention as herein disclosed, constitutes a preferred form, it is to be understood that other forms might be adopted.

What is claimed is as follows:

1. A cooking range having walls forming an open front oven therein, a shiftable sectional closure means normally closing the open front of said oven, said closure means comprising a top door and a bottom door, the lower portion of said bottom door being pivotally mounted upon said range and having its upper portion hingedly mounted to the lower portion of said top door, lever arms movably linking said top door to walls of said range, a shelf on said top door projecting laterally from the inner face thereof into said oven while said closure means is in closed position, said shelf being adapted to receive a broiler receptacle for containing an article to be broiled in said oven, said lever arms being constructed and arranged to guide said top door upon application of force to the closure means outwardly away from said range and downwardly relative thereto continuously in vertical planes substantially paralleling the oven front to at all times maintain said shelf in a horizontal plane and for removing the shelf from said oven, said movement of the top door swinging the bottom door about its said mountings whereby said doors are simultaneously descended and provide access to the interior of said oven, and said range including a settable stop means engageable by one of said lever arms for limiting the opening shifting movement of said closure means and stopping same intermediate its fully closed and fully open positions to rigidly support said shelf and a broiler receptacle thereon outside said oven closely adjacent the open front thereof.

2. A cooking range as defined by claim 1 wherein the settable stop means is provided with a member movable relative to other portions thereof by the one lever arm upon shifting the closure means from its fully open position toward the closed position whereby to close the open front of the oven while said settable stop means is set.

3. A cooking range having walls forming an open front oven and an open front storage compartment therein below said oven, a shiftable sectional closure means common to said oven and said compartment normally closing the open fronts thereof, said closure means comprising a top door and a bottom door, the lower portion of said bottom door being pivotally mounted upon said range and having its upper portion hingedly mounted to the lower portion of said top door, lever arms movably linking said top door to walls of said range, a shelf on said top door projecting laterally from the inner face thereof into said oven while said closure means is in closed position, said shelf being adapted to receive a broiler receptacle for containing an article to be broiled in said oven, said lever arms being constructed and arranged to guide said top door upon application of force to the closure means outwardly away from said range and downwardly relative thereto continuously in vertical planes substantially paralleling the oven front to at all times maintain said shelf in a horizontal plane and for removing the shelf from said oven, said movement of the top door swinging the bottom door about its said mountings whereby said doors are simultaneously descended to provide access to the interior of said oven and to shift said shelf into alignment with the opened storage compartment, and said range including a settable stop means engageable by one of said lever arms for stopping the opening shifting movement of said closure means prior to movement thereof to align said shelf with said compartment whereby the shelf and a broiler receptacle thereon is rigidly supported outside and adjacent the open oven.

4. A cooking range having walls forming an open front oven therein, a support in said oven for receiving and supporting a roasting receptacle adapted to contain an article to be roasted within the oven, a shiftable sectional closure means normally closing the open front of said oven, said sectional closure means comprising a top door and a bottom door, the lower portion of said bottom door being pivotally mounted upon said range and having its upper portion hingedly mounted to the lower portion of said top door, lever arms movably linking said top door to walls of said range, a shelf on said top door projecting laterally from the inner face thereof into said oven spaced above said support therein while said closure means is in closed position, said lever arms being constructed and arranged to guide said top door upon application of force to the closure means outwardly away from said range and downwardly relative thereto continuously in vertical planes substantially paralleling the oven front to at all times maintain said shelf in a horizontal plane and for removing the shelf from said oven, said movement of the top door swinging the bottom door about its said mountings whereby said doors are simultaneously descended to provide access to the interior of said oven, and stop means on said range engageable by one of said lever arms for stopping the opening shifting movement of said closure means at a predetermined point therealong to locate the shelf on said top door at the front of and in horizontal alignment with said support to provide a continuation thereof whereby a roasting receptacle on the support is slidable in a straight horizontal plane outwardly of said oven and at least partially supportable at the front thereof by said door shelf.

5. A cooking range having walls forming an open front oven and an open front storage compartment therein below said oven, a support in said oven for receiving and supporting a roasting receptacle adapted to contain an article to be roasted within the oven, a shiftable sectional closure means common to said oven and said compartment normally closing the open fronts thereof, said closure means comprising a top door and a bottom door, the lower portion of said bottom door being pivotally mounted upon said range and having its upper portion hingedly mounted to the lower portion of said top door, lever arms movably linking said top door to walls of said range, a shelf on said top door projecting laterally from the inner face thereof into said oven spaced above said support therein while said closure means is in closed position, said lever arms being constructed and arranged to guide said top door upon application of force to the closure means outwardly away from said range and downwardly relative thereto around said support continuously in vertical planes substantially paralleling the oven front to at all times maintain said shelf in a horizontal plane and for removing the shelf from said oven, said movement of the top door swinging the bottom door about its said mountings whereby said doors are simultaneously descended to shift said shelf into alignment with the opened storage compartment, and said range including a settable stop means engageable by one of said lever arms for limiting the opening shifting movement of said closure means and stopping same intermediate its fully closed and fully open positions to rigidly hold said shelf in horizontal alignment with said support to provide a continuation thereof whereby a roasting receptacle on the support is slidable in a straight horizontal plane outwardly of said oven and at least partially supportable at the front thereof by said door shelf.

6. A cooking range as defined by claim 5 wherein the settable stop means is provided with a member movable relative to other portions thereof by the one lever arm upon shifting the closure means from its fully open position toward the closed position whereby to close the open fronts of the oven and storage compartment while said settable stop means is set.

7. A cabinet having walls forming an open front chamber therein, a shiftable sectional closure means normally closing the open front of said chamber, said closure means comprising a first door and a second door, one edge portion of said first door being pivotally mounted upon said cabinet and having its opposite edge portion hingedly attached to an edge portion of said second door, lever arms movably linking said second door to walls of said cabinet, a shelf on said second door projecting laterally from the inner face thereof into said chamber while said closure means is in the closed position, said lever arms being constructed and arranged to guide said second door, upon applying force to said closure means, outwardly away from said cabinet in vertical planes therealong for removing said shelf from said chamber and supporting same in a horizontal position beyond and spaced from a horizontal inner wall surface of the chamber, said movement of said second door swinging said first door about its mounting whereby said doors are simultaneously moved to locate the closure means in a fully open position affording access to said chamber, said cabinet including a settable stop means engageable by one of said lever arms for limiting the opening shifting movement of said closure means, and said stop means when set stopping said closure means intermediate its closed and its fully open positions to support said shelf between top and bottom walls of said chamber in alignment with the open front thereof.

8. A cabinet having walls forming an open front chamber therein, a shiftable sectional closure means normally closing the open front of said chamber, said closure means comprising a first door and a second door, one edge portion of said first door being pivotally mounted upon said cabinet and having its opposite edge portion hingedly attached to an edge portion of said second door, lever arms movably linking said second door to walls of said cabinet, a shelf on said second door projecting laterally from the inner face thereof into said chamber while said closure means is in the closed position, said lever arms being constructed and arranged to guide said second door, upon applying force to said closure means, outwardly away from from said cabinet in vertical planes therealong for removing said shelf from said chamber and supporting same in a horizontal position beyond and spaced from a horizontal inner wall surface of the chamber, said movement of said second door swinging said first door about its mounting whereby said doors are simultaneously moved to locate the closure means in a fully open position affording access to said chamber comprising a member engageable by one of said lever arms for limiting the opening shifting movement of said closure means, said stop means when set stopping said closure means intermediate its closed and its fully open positions to support said shelf between top and bottom walls of said chamber in alignment with the open front thereof, and said member of the settable stop means being movable relative to other portions thereof by said one lever arm upon shifting said closure means from its said fully open position toward the closed position whereby to close the open front of said chamber while the settable stop means is set.

9. A cabinet having walls forming an open front chamber therein, a shiftable sectional closure means normally closing the open front of said chamber, said closure means comprising a top door and a bottom door, the lower portion of said bottom door being pivotally mounted upon said cabinet and having its upper portion hingedly attached to the lower portion of said top door, lever arms movably linking said top door to walls of said cabinet, a shelf on said top door projecting laterally from the inner face thereof into said chamber while said closure means is in the closed position, said lever arms being constructed and arranged to guide said top door, upon applying force to the closure means, outwardly away from said cabinet and downwardly therealong for removing said shelf from the chamber and supporting same in a horizontal position below and spaced from the inner surface of the lower wall of said chamber, said movement of the top door swinging the bottom door about its mounting whereby said doors are simultaneously descended to locate said closure means in a fully open position affording access to said chamber, said cabinet including a settable stop means engageable by one of said lever arms for limiting the opening shifting movement of said closure means, and said stop means when set stopping said closure means intermediate its closed and its fully open positions to support said shelf between upper and lower walls of said chamber in alignment with the open front thereof.

10. A cabinet having walls forming an open front chamber therein, a shiftable sectional closure means normally closing the open front of said chamber, said closure means comprising a top door and a bottom door, the lower portion of said bottom door being pivotally mounted upon said cabinet and having its upper portion hingedly attached to the lower portion of said top door, lever arms movably linking said top door to walls of said cabinet, a shelf on said top door projecting laterally from the inner face thereof into said chamber while said closure means is in the closed position, said lever arms being constructed and arranged to guide said top door, upon applying force to the closure means, outwardly away from said cabinet and downwardly therealong for removing said shelf from the chamber and supporting same in a horizontal position below and spaced from the inner surface of the lower wall of said chamber, said movement of the top door swinging the bottom door about its mounting whereby said doors are simultaneously descended to locate said closure means in a fully open position affording access to said chamber, said cabinet including a settable stop means comprising a member engageable by one of said lever arms for limiting the opening shifting movement of said closure means, said stop means when set stopping said closure means intermediate its closed and its fully open positions to support said shelf between upper and lower walls of said chamber in alignment with the open front thereof, and said member of the settable stop means being movable relative to other portions thereof by said one lever arm upon shifting said closure means from its fully open position toward the closed position whereby to close the open front of said chamber while the settable stop means is set.

References Cited in the file of this patent
UNITED STATES PATENTS

| | | |
|---|---|---|
| 1,434,705 | Jeanes | Nov. 7, 1922 |
| 2,038,329 | Wells | Apr. 21, 1936 |
| 2,241,179 | Brenkert | May 6, 1941 |
| 2,635,708 | Lampe | Apr. 21, 1953 |
| 2,774,506 | Miller | Dec. 18, 1956 |